Oct. 25, 1938.  H. O. HENDRIKSEN  2,134,477
WEATHER GUARD
Filed Dec. 1, 1937   2 Sheets-Sheet 1
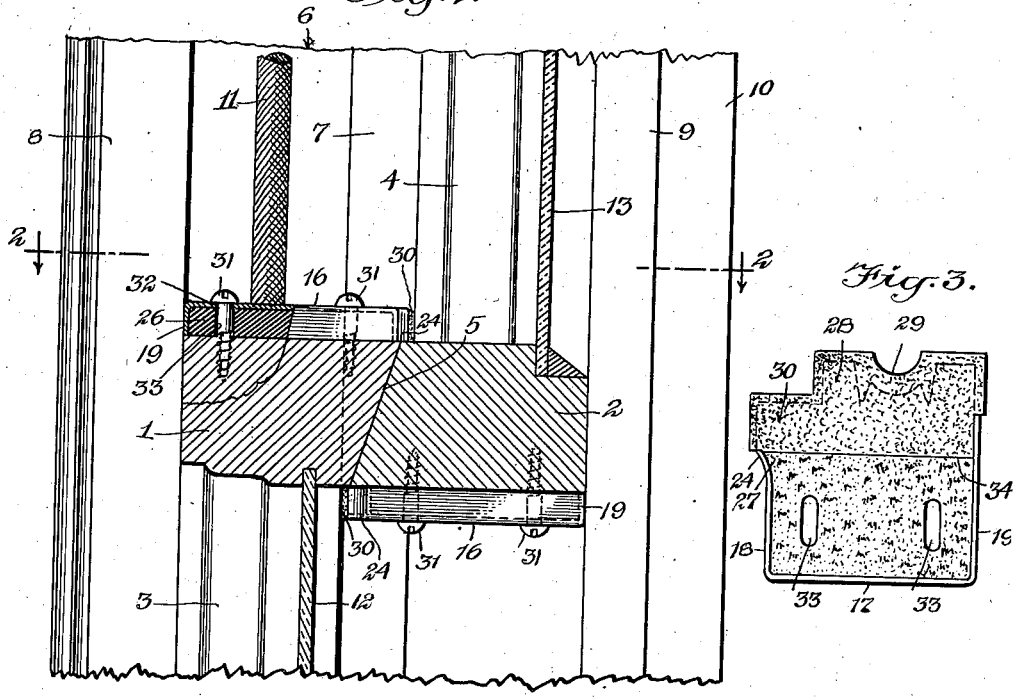
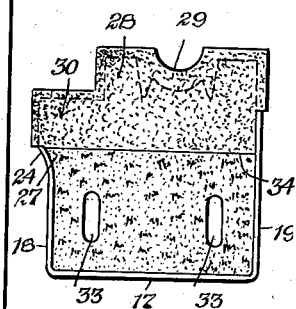
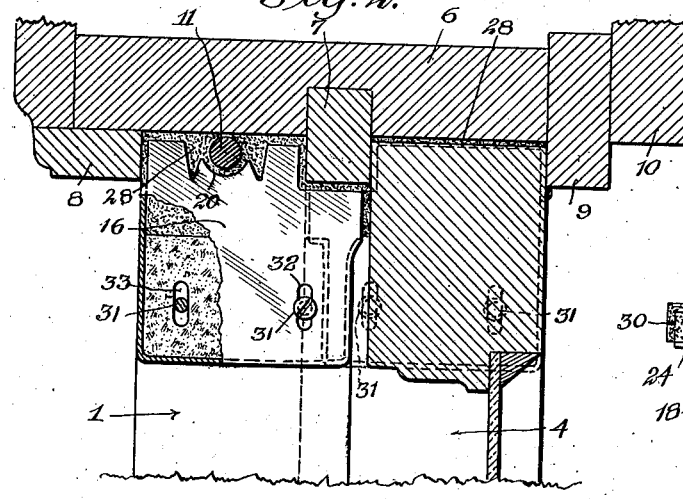
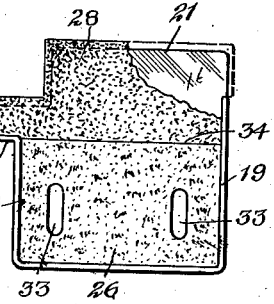
WITNESSES
INVENTOR
Henry O. Hendriksen
BY
ATTORNEYS Oct. 25, 1938.  H. O. HENDRIKSEN  2,134,477
WEATHER GUARD
Filed Dec. 1, 1937  2 Sheets-Sheet 2
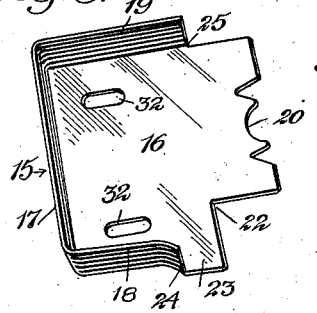
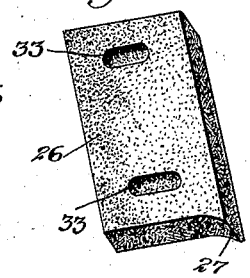
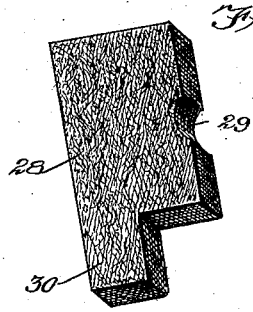
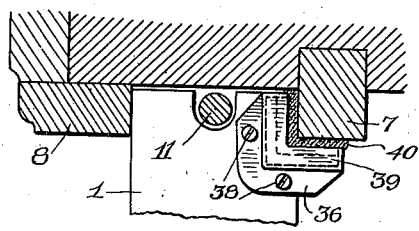
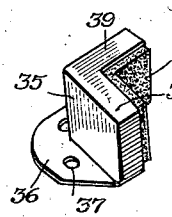
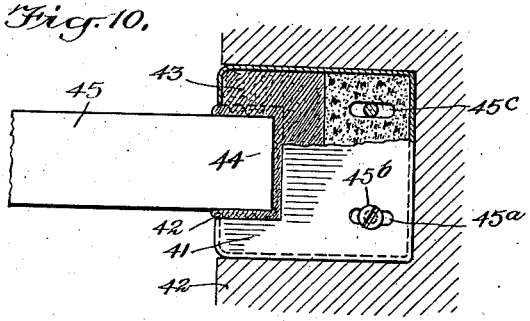
WITNESSES
INVENTOR
Henry O. Hendriksen
BY
Anderson & Liddy
ATTORNEYS Patented Oct. 25, 1938

2,134,477

UNITED STATES PATENT OFFICE 2,134,477

WEATHER GUARD

Henry O. Hendriksen, Brooklyn, N. Y.

Application December 1, 1937, Serial No. 177,426

2 Claims. (Cl. 20—52.4)

The present invention relates to weather guards for windows, doors, and other movable closures of outer wall openings in dwellings and other buildings.

One of its objects is to provide a weather guard having a co-operating elastic cushion and a contact pad; the cushion being made of rubber and the contact pad, which is backed up and supported by the cushion, of some yielding fibrous material such as felt, and to so combine the two that the felt contact pad will be forced by the rubber cushion against the adjacent parts of the frame of an outer wall opening, the closure comprising a sliding window sash or door, the weather guard operating in such manner as to effectually seal the space between the frame and closure when closed to exclude and prevent the entry of wind and rain between the closure and frame.

A further object is to provide such a weather guard with a simple and effective protective casing to receive and retain the elastic cushion and the contact pad, so constructed as to resist the expansion of the rubber cushion in its own plane excepting that expansion which is caused by pressure against the face or exposed edge of the contact pad against the frame in effecting and maintaining a weatherproof seal between the adjacent surfaces of the movable and fixed parts of a window or door closure at points where wind or rain usually enters when the window or door is closed.

To the above ends the present invention consists of a weather guard for movable closures in wall openings combining a supporting elastic cushion and a fibrous contact pad so combined and arranged that the cushion will force the free edge of the contact pad against the adjacent frame of the closure with sufficient pressure to exclude wind and rain.

A further object is to provide a protective casing for the cushion and the contact pad by means of which they will be retained in proper relation to each other in the same plane with the contact pad pressed against the frame to effect a weatherproof sealing of the opening when the window or door is closed.

The invention further consists of the devices and combinations of devices which will be hereinafter described and claimed.

The invention is shown in the accompanying drawings in which—

Fig. 1 shows partly in elevation and partly in vertical section a portion of one side of a window frame having vertically movable sash members with the weather guard affixed in operative position;

Fig. 2 shows a horizontal section taken on the line 2—2 of Fig. 1;

Fig. 3 shows in bottom plan view one of the weather guards removed;

Fig. 4 is a view substantially the same as Fig. 3, of a slightly modified form with a portion of the contact pad removed at one forward corner;

Fig. 5 shows a perspective of the retaining and protective casing looking at the underside thereof;

Fig. 6 shows in perspective the elastic cushion;

Fig. 7 shows in perspective the fibrous contact pad;

Fig. 8 is a view partially in horizontal section and partially in plan showing a modification;

Fig. 9 is a perspective of the form of guard shown in Fig. 8;

Fig. 10 shows partly in elevation and partly in horizontal section, a form of the weather guard adapted for use in connection with vertical sliding doors;

Similar reference characters will be employed to designate corresponding parts.

In Figs. 1 and 2 the weather guard is shown applied to the upper and lower surfaces, respectively, of the upper cross bar 1 and the lower cross bar 2 of inner and outer sash members 3 and 4 of vertically sliding sash members. The meeting edges of the cross bars 1 and 2 of the sash members will be beveled as usual, as indicated at 5, so that when the sash members are closed they will form an inclined joint from end to end.

The sash members 3 and 4 have a vertical sliding movement in the window frame composed of side members 6, only one being shown which is provided upon its inner surface with a vertically disposed parting strip 7 extending the full length of the window frame, which projects beyond the inner face of the side member 6 and forms a contact guide for the adjacent edges of the sash members 3 and 4. As usual in such constructions the window frame, upon its inner portion which is inside the wall of the building, is provided with a slat or bar 8 which is removably secured in any suitable manner, usually by screws, and extends the full length of the opening in the window frame engaging the inner surface at the sides of the sash member 3 retaining it in position and permitting it to freely slide vertically to raise and lower it in opening and closing the window opening. At its outer surface or that surface which is exposed at the out-side of the building, there is a retaining strip 9 which engages the marginal edge of the sash member 4, and also the frame member is provided with an outer finishing strip 10. The strips 8 and 9 cooperate with the parting strip 7 to form guiding grooves or stiles which hold the sash members in the frame while permitting them to have a vertical sliding movement.

As usual in such constructions the sash members are connected to a flexible cord or chain 11 (only one of which is shown in the drawings) which carries a weight (not shown) whereby to counterbalance the respective sash members and to hold them at different points along the frame, and also to hold the sash member 4 firmly in the upper or closed position. The sash members 3 and 4 will be provided with the usual glass panels 12 and 13 which may be secured in any suitable manner.

In window closures such as described, unless the parts fit in close contact with each other, considerable air will be admitted and some times in a storm a strong wind will force rain about the edges of the sash members and will cause them to rattle. This necessitates the use of weather guards which generally take the form of a so-called weather strip which is secured to the frame of the window and is provided with a strip of flexible material such as rubber or felt pressed against the inner face of the side and bottom members of the sash. Such weatherstripping is effective to a certain extent but it deteriorates rapidly and must be renewed frequently because the strip of flexible material, if made of rubber, becomes hardened and loses its elasticity, and if made of felt or cloth will quickly become set and bent-over by the frequent moving of the window sash to open and close the window.

In the present invention I have combined a separate elastic rubber cushion and a contact pad of felt and have placed them in a casing so that the elastic cushion will be entirely covered and protected from the elements and the felt contact pad will be held with its free edge projecting in yielding contact with the window frame and free to move slightly in its casing as the elastic cushion yieldingly backs it up, with both the elastic cushion and the fibrous contact pad of substantial thickness so that while the free edge of the contact pad closely engages the guiding surfaces of the window frame 6, the parting strip 7 and the retaining strips 8 and 9, it will not be bent out of shape or distorted at its free edges.

That form of the invention which is shown in Figs. 1 to 7 inclusive is intended to be affixed to the upper surface of the upper sash member 1 at each end thereof, and to the under surface of the lower sash member 2 at each end thereof, in such manner that the cushioning member and the contact pad or member will be enclosed and protected from the elements. For this purpose there is provided a casing 15 formed of a metal stamping or some other suitable light but strong material which can be shaped and set, such as bakelite or other plastic material.

The casing 15 comprises a top plate 16 having a flange 17 extending across the rear edge of the casing and extended about the sides of the casing as at 18 and 19 forming a chamber to receive the elastic cushion and the fibrous contact pad, with the elastic cushion entirely covered and concealed and firmly held from lateral movement between the flanges 18 and 19.

In Figs. 3 and 5 is shown that form of casing which is to be secured to the upper surface of the sash member 1 at its opposite ends, and for this purpose the projecting forward edge of the plate 16 will be provided with a notch 20 so as to fit around the sash cord 11. In the form of casing shown in Fig. 4, which is to be secured to the under surface of the sash member 3 at its opposite ends, the forward edge of the top plate 16 is formed in a straight line as indicated at 21 in Fig. 4. In both forms the top plate 16 will be provided with a notch 22 to fit about the parting strip 7 and the flange 18 will be cut away as indicated at 23 and provided with an out-turned bearing 24 at its free end. In both forms the flange 19 will be cut away as indicated at 25.

The elastic cushion 26 (see Fig. 6) comprises an integral block of elastic and compressible rubber generally rectangular and of uniform thickness, and of a shape and size to fit within the flanges 17, 18 and 19. In thickness it is substantially the same as the width of the flanges 17, 18 and 19, and in the form shown in Figs. 3 and 6, will be provided at one of its forward corners with an angular projecting lip 27 to rest upon the out-turned end 24 of the flange 18.

In Fig. 4 where the out-turned end of the flange 18 extends at right angles, the cushion 26 will at all edges be cut on a straight line.

The contact pad 28 of felt or other suitable fibrous material, when used with the casing 15 (as shown in Fig. 3) will be provided with a notch 29 in its forward edge to surround the cord 11 and at one end it will be provided with a projection 30 which will extend through the open end of the case 15 as shown in Figs. 3 and 4. In both forms the contact pad will be provided with an extension 30 projecting through the openings 23. In both forms the contact pad 28 will project marginally beyond the free edges of the plate 16 of the casing so that when affixed to the sash members 1 and 2 the free edge of the contact pads will make close contact with the inner face of the frame member 6 and the adjacent faces of the parting strip 7 and the retaining strips 8 and 9 of the window frame (all as shown in Figs. 1 and 2 of the drawings).

The casings are secured to the sash members by means of screws 31 which pass through slots 32 in the top plate 16 and through slots 33 in the elastic cushions 26. In attaching the device to the sash members the casings 16 of course will be moved laterally with some force towards the adjacent surfaces of the window frame including the parting strips 7 and the retaining strips 8 and 9, so that the contact pads 28 will make close contact with the adjacent surfaces of the window frame, including the strips 7, 8 and 9, after which the screws 31 will be tightly set to hold the contact pads in weather-tight contact with the adjacent surfaces of the window frame.

It is to be noted that the flanges 17, 18 and 19 of the casing are of such a depth that they will prevent any pressure upon the combined elastic cushions and contact pads, leaving them free so as to provide for the compression and expansion of the elastic cushion in its own plane to that extent required to insure the desired pressure on the contact pad to maintain it in an advanced position, so as to effectively produce a weather-tight joint between the sash members and the adjacent parts of the window frame.

It is to be noted that the parts are of such relative size that the rubber cushioning member 26 is retained within the casing and in contact at both ends with the parallel flanges 18 and 19 at all points below the base of the notch opening 23 in the casing, at which point it makes contact as shown by the lines 34 with the fibrous contact pads 28, and that the top of the casing 16 will have its forward edges so placed as to permit the forward edges of the contact pads 28 to extend beyond the free edges of the top 16 of the casing as shown in Figs. 2, 3 and 4.

The foregoing construction is such that when the sash members 1 and 2 are in closed position a weather-tight joint will be provided at each side of the window and that this will be accomplished by the co-operation of both the rubber cushion and the felt contact pad, the rubber being covered and protected to preserve its elasticity and the felt or fibrous pad being securely held and guided in the casing at all times in yielding contact with the adjacent surfaces of the window sash and frame, thus forming an effective weatherproof joint excluding wind and rain. It will be observed also that the lateral parallel flanges of the casing engaging the opposite ends of the elastic cushion 26 affords means exerting endwise compressive pressure in the plane of the elastic cushion, thus insuring the maintenance of sufficient elastic force to yieldingly resist the inward movement of the felt contact pad.

In the modification shown in Figs. 8 and 9, the device is constructed to make contact only with two adjacent exposed surfaces of the parting strip 7 disposed at an angle to each other. In this form the angular casing 35 is provided with a base member 36 perforated as at 37 to receive attaching screws 38. The casing 35 also is provided with a top flange 39 angular in form. The angular members of the casing are open at the front and receive a contact pad 40 backed up by a rubber cushion (as indicated in dotted lines in Fig. 8) fitting within the chambers in the front of the angularly disposed members of the casing. In this form the device will be applied to the top surface of the sash member 1 and to the bottom surface of the sash member 2 at opposite corners, and when in use will exclude wind and rain at the points of contact with the parting strip 7 and will also prevent rattling.

In the form shown in Fig. 10 the casing takes the form of a box 41 which may be fitted within the framework of a vertically sliding door and in this form the fibrous contact pad 43 is provided at its front edge with a rectangular recess 42 to receive and engage the edge 44 of a sliding door 45, a portion only of which is shown. Screws 45b and slots 45a and 45c enable the casing to be firmly attached to the door casing.

It will be noted that in operation the contact pads not only close the openings or space between the fixed frame and the movable closure forming a weatherproof joint directly at such points of contact but they also cause adjacent portions of the frame and movable closures remote from the direct action of the guards to make close contact with each other to thereby exclude wind and rain.

It is thought that the operation of the weather guard has been sufficiently described in connection with the foregoing description of its construction and that further description of the operation will be deemed unnecessary.

I claim:

1. A weather guard for movable closures, comprising a casing having a cover plate provided with downwardly extending protective and confining flanges along three sides, the cover plate projecting beyond the flanges along one side, a rubber elastic cushion fitted within the flanges, and a contact pad located in advance of the elastic cushion, the cushion and contact pad being of a thickness corresponding to the depth of the flanges, and means to adjustably secure the casing with the uncovered edge of the contact pad in close engagement with the adjacent parts of the frame for the movable closure.

2. A weatherproof closure for a window, having a frame, a sliding sash and a parting strip, comprising a casing having a cover plate provided with a plurality of slots, downwardly extending protective and confining flanges along three edges, said casing being open at the side facing said frame, said cover plate projecting beyond the flanges along the open side, an elastic cushion formed with slots adapted to register with the slots in the cover plate fitted within said flanges, a contact pad located in advance of the elastic cushion and projecting beyond said cover plate toward said frame, the cushion and contact pad being of a thickness corresponding to the depth of the flanges, and means extending through said slots to adjustably secure the casing with the uncovered edge of the contact pad in close engagement with the adjacent parts of the frame and parting strip.

HENRY O. HENDRIKSEN.